(12) United States Patent
Carver et al.

(10) Patent No.: US 11,677,338 B2
(45) Date of Patent: *Jun. 13, 2023

(54) PRODUCING ELECTRICAL ENERGY USING AN ETALON

(71) Applicant: Calagen, Inc., Portland, OR (US)

(72) Inventors: David Reginald Carver, Baton Rouge, LA (US); Sean William Reynolds, Baton Rouge, LA (US); Sean Claudius Hall, Baton Rouge, LA (US)

(73) Assignee: Calagen, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,090

(22) Filed: Apr. 11, 2022

(65) Prior Publication Data

US 2022/0231620 A1 Jul. 21, 2022

Related U.S. Application Data

(63) Continuation of application No. 17/229,692, filed on Apr. 13, 2021, now Pat. No. 11,309,810, which is a continuation-in-part of application No. 17/175,248, filed on Feb. 12, 2021, now Pat. No. 11,223,301, which is a continuation of application No. 16/997,557, filed on Aug. 19, 2020, now Pat. No. 10,951,136.

(60) Provisional application No. 63/009,856, filed on Apr. 14, 2020, provisional application No. 62/889,506, filed on Aug. 20, 2019.

(51) Int. Cl.
*H02N 3/00* (2006.01)
*H01L 35/30* (2006.01)
*F25B 21/02* (2006.01)

(52) U.S. Cl.
CPC ..................... *H02N 3/00* (2013.01)

(58) Field of Classification Search
CPC ........... H02N 3/00; H01L 35/00; H01L 35/28; H01L 35/30; H02M 3/00; H02M 11/00; H03B 5/08; H02J 50/10; F25B 21/00; F25B 21/02

See application file for complete search history.

(56) References Cited

U.S. PATENT DOCUMENTS

| | | | | |
|---|---|---|---|---|
| 3,170,130 A | * | 2/1965 | Begley | ..................... H01L 35/00 174/15.1 |
| 3,343,009 A | * | 9/1967 | Wagini | ..................... H01L 37/00 310/11 |
| 3,355,605 A | | 11/1967 | Okress | |
| 3,452,225 A | * | 6/1969 | Gourdine | ................. H02N 3/00 310/11 |

(Continued)

FOREIGN PATENT DOCUMENTS

| | | |
|---|---|---|
| DE | 10 2009 051949 A1 | 5/2011 |
| JP | 2013520953 A | 6/2013 |
| WO | WO 2011/104645 A2 | 9/2011 |

*Primary Examiner* — Edgardo San Martin
(74) *Attorney, Agent, or Firm* — Klarquist Sparkman, LLP

(57) ABSTRACT

A circuit for generating electrical energy is disclosed. The circuit uses a pulse generator in combination with a conductor. Waste heat can be converted to usable energy due to a cooling effect of the circuit on the conductor. A resultant energy applied to a load is larger than the energy supplied by the pulse generator due to the absorption of external energy by the conductor.

20 Claims, 13 Drawing Sheets

(56) References Cited

U.S. PATENT DOCUMENTS

| | | | | |
|---|---|---|---|---|
| 3,487,334 | A | * | 12/1969 | Eastman ................ H03B 9/143 331/107 DP |
| 4,000,482 | A | * | 12/1976 | Staub .................... H01F 27/322 336/60 |
| 4,016,438 | A | | 4/1977 | Holt |
| 4,041,412 | A | * | 8/1977 | Malone .................... H03L 7/06 330/306 |
| 5,684,678 | A | * | 11/1997 | Barrett ................ H02M 3/3376 363/17 |
| 6,595,004 | B1 | * | 7/2003 | Ghoshal .................. H01L 35/00 62/3.1 |
| 7,816,601 | B2 | * | 10/2010 | Carver .................... H01L 37/00 310/306 |
| 8,538,529 | B2 | * | 9/2013 | James .................... H02N 1/006 363/19 |
| 9,559,617 | B2 | | 1/2017 | Landa et al. |
| 10,199,165 | B2 | | 2/2019 | Carver et al. |
| 10,951,136 | B1 | * | 3/2021 | Carver ................ H05B 1/0283 |
| 11,056,265 | B2 | * | 7/2021 | Carver .................... H01L 35/28 |
| 11,223,301 | B2 | | 1/2022 | Carver et al. |
| 11,303,229 | B2 | | 4/2022 | Carver et al. |
| 11,309,810 | B2 | * | 4/2022 | Carver .................... H02N 3/00 |
| 2007/0175217 | A1 | * | 8/2007 | Fellows .................. H01L 37/04 290/1 R |
| 2007/0253224 | A1 | | 11/2007 | Cohen et al. |
| 2009/0133409 | A1 | * | 5/2009 | Chen ...................... H01L 23/473 62/3.6 |
| 2011/0148248 | A1 | * | 6/2011 | Landa .................... H01J 45/00 310/306 |
| 2011/0242855 | A1 | * | 10/2011 | Jovcic .................... H02M 3/07 363/17 |
| 2012/0086533 | A1 | * | 4/2012 | Wei ........................ H01F 30/14 29/606 |
| 2013/0207763 | A1 | * | 8/2013 | Wagoner ................ H01F 27/22 336/60 |
| 2014/0062635 | A1 | * | 3/2014 | Delanoe ................ H01F 27/245 336/61 |
| 2015/0262762 | A1 | * | 9/2015 | Ikenuma ................ H01M 4/366 429/232 |
| 2015/0267944 | A1 | * | 9/2015 | Duwel .................... F25B 21/00 62/3.1 |
| 2016/0128141 | A1 | * | 5/2016 | Makosinski ............ F21L 13/00 315/294 |
| 2019/0103538 | A1 | * | 4/2019 | Carver .................... H02M 11/00 |
| 2021/0305916 | A1 | | 9/2021 | Carver et al. |
| 2022/0209688 | A1 | | 6/2022 | Carver et al. |
| 2022/0393575 | A1 | | 12/2022 | Carver et al. |

* cited by examiner

PRODUCING ELECTRICAL ENERGY USING AN ETALON

CROSS REFERENCE TO RELATED APPLICATION

This is a continuation of U.S. application Ser. No. 17/229,692, filed Apr. 13, 2021, which is a continuation-in-part of U.S. application Ser. No. 17/175,248, filed Feb. 12, 2021, now U.S. Pat. No. 11,223,301, which application is a continuation of U.S. patent application Ser. No. 16/997,557, filed on Aug. 19, 2020, now U.S. Pat. No. 10,951,136, which application claims priority from U.S. Provisional Application No. 62/889,506, filed Aug. 20, 2019. In addition, this application claims priority from U.S. Provisional Application No. 63/009,856, filed Apr. 14, 2020. All applications are incorporated herein by reference in their entirety.

BACKGROUND

Generation of electrical energy is a fundamental technique for our society's energy needs. Conversion of the thermal energy contained in a plasma flame, such as a cylinder in an internal combustion engine, is an example of the utilization of thermal energy to provide for its conversion into mechanical energy. If thermal energy is available, a complicated and expensive device, such as a Carnot engine or Stirling cycle engine, is used to convert the heat energy from a hot sink and a cold sink into mechanical energy. The limitations to such devices are the temperature differentials between the two heat sources must be substantial. Efficiencies in the range of 15 to 30% are typical for the larger engines. Small temperature differences, such as a few degrees Celsius, are of little practical value. Other methods such as direct thermoelectric conversion using devices, such as a thermocouple, suffer the same lack of practical utility when the temperature differences are small. A convenient and direct method for the conversion of thermal energy to electrical energy is a much needed and desirable method for generating electrical power.

DETAILED DESCRIPTION

A method and system are disclosed for the generation of electrical energy for use in numerous applications. The method is general in its applications and can be applied to many electrically powered devices, such as portable tools, sensors, optical devices, lighting, heating, cooling, breathing apparatus, medical devices, timing devices, portable computers, cell phones, powered cooling or heating devices as well as other similar and larger stationary applications where a convenient and powerful supply of electrical energy is needed. The need for such a device and method is well documented. More specifically, there is a need to have a more general and better converter of mechanical, electrical, solar, electromagnetic, and other energies from one form to electrical energy. A converter that has better input tolerance to different energy forms, if it be DC, AC, heat, EM radiation, or other sources of energy with variable frequencies, periods, and intensities, with the capabilities to be able to output different voltages, waveforms, and currents to the application loads they are connected and having the commonality of a single simple electrical output, is very much needed. Additionally, the converter should work with very low temperature differences between the ambient temperature and the heat source. As such it should be termed a "waste heat converter".

The Carver Voltaic Effect (CVE) is a kinetic physical effect that can be used to provide significant electrical power. The CVE can be described as the minute transient increase in the power of a single power transmission transient in electrical conductors or in energy transfers in materials through space. The term "kinetic" is used to describe the transitory nature of the effect. It can be detected during transitory events, such as fast voltage changes and some other phase and state changes in materials. Embodiments of the devices described herein are constructed to take advantage of this phenomena (i.e., the CVE) by the conversion of thermal energy to electrical energy. The magnitude of the CVE is associated with large dV/dt values (changes in voltage with respect to time).

Understanding the operation and manufacture of the device includes the recognition of the presence of an etalon in the output circuit and methods for the implementation and manufacture of the etalon are disclosed.

Figure 1:
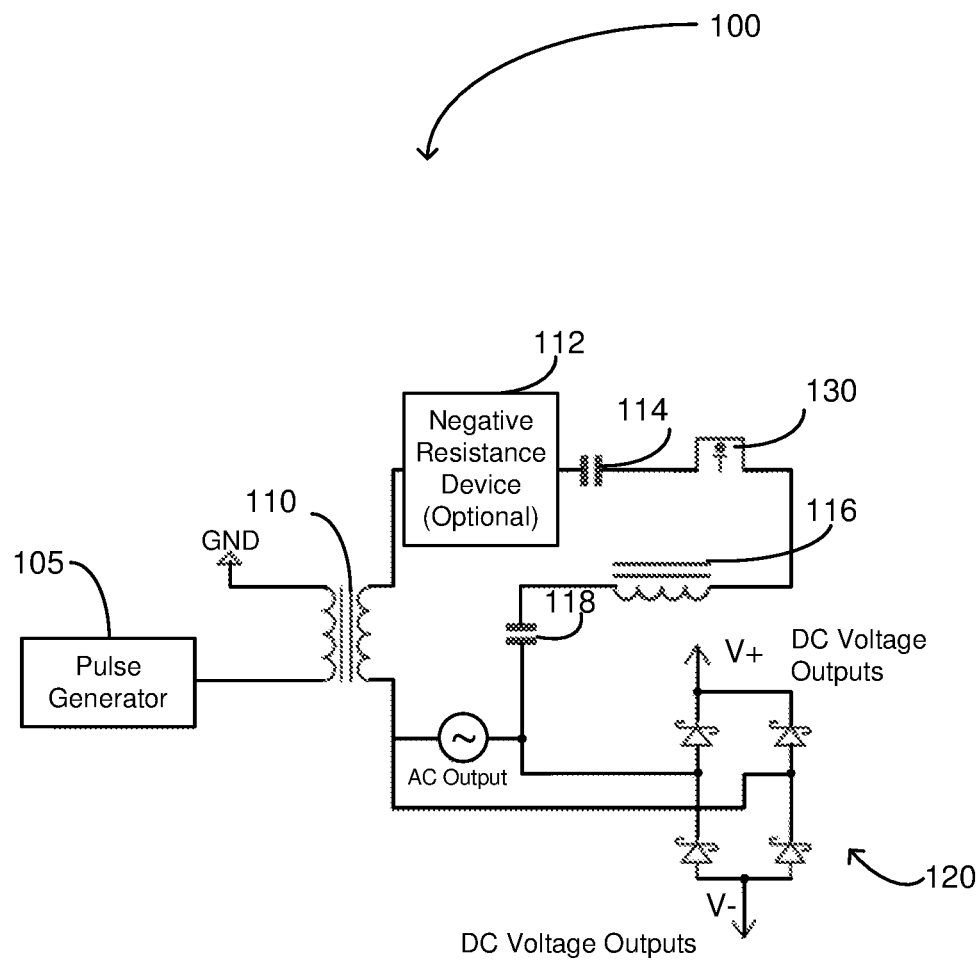
FIG. 1 is an example Carver Voltaic Effect (CVE) circuit used for generating electrical energy.

FIG. 1 is a CVE circuit 100 for converting thermal energy into electrical energy. A square wave generator 105 generates a square wave pulse train (continuous pulses) that enters a primary side of a coupled inductor 110. The coupled inductor's secondary side is connected to a nonlinear resistive device, or as is sometimes called, a negative resistance device 112, such as a thyristor. The negative resistance is optional and not used in many cases. The negative resistance device 112 serves as a device to limit the current from the secondary side to a certain value determined by its internal construction based upon the input voltage. It will not conduct meaningful current until the voltage exceeds a certain amount in the positive direction and will not conduct in the negative voltage range until the voltage is more negative than a certain amount. For example, the two voltages may be +25V and −25V. Because of this voltage characteristic, the output of the secondary side of the coupled inductor is always certain to exceed +25V and −25 Volts provided sufficient power is available to overcome parasitic losses.

The negative resistance device can be any device that can provide this type of action. Example devices include, but are not limited to, the following:
1. Gas discharge lamps
2. Spark gaps
3. Zener diodes
4. Thyristors
5. Triacs
6. Gunn diodes
7. Diodes (all kinds)
8. Silicon controlled rectifiers (SCR)
9. Switching devices controlled by a logic circuit As the driving electronics for the transformer (or coupled inductor) cause the output of the secondary to swing from positive to negative, very fast transitions from the >25V to more negative than −25V will take place. These high dV/dt transients are then utilized to produce fast voltage swings desired for the CVE to be utilized. Thus, the larger the dV/dt (higher voltage, less time), the more pronounced the CVE. The square wave in combination with the negative resistance device 112 help to achieve this goal. In this example, the capacitor C1 114 and the inductor 116 form an oscillatory circuit that further amplifies the effects of the current with its voltage swings to produce a useful output at C2 118. The C2 capacitor 118 is in turn connected to one or more rectification diodes, shown generally at 120 to produce both a positive and negative voltage output, V+ and V−, respectively. The oscillatory circuit formed by the capacitor 114 and inductor 116 can generate a signal oscillating at a frequency greater than the frequency of the square wave input signal.

A thermal exchanger 130 provides a thermal conduction path for the materials to have a continual influx of thermal energy for conversion to electrical energy. The thermal exchanger can be any device used to receive heat into the circuit. In one example, a tube (e.g., a conductive tube or non-conductive tube) is used that is filled with material having a desired permittivity and permeability. Potential materials include air, water, methanol, ethanol, and acetamide (or a solution in liquids such as water or ethanol). Ferrite slurries can also be used. The material can be pumped or circulated through the tube using an external pump, not shown. Alternatively, the solid materials can be immobilized within the resonant cavity. Subsequently liquids can be pumped through the tube to provide heat exchange to the materials and the tube itself. The tube can be any desired length. For example, the tube can be 1 ft to 5 ft in length. The tube can be any desired shape in cross-section such as round, square, rectangular, elliptical, a flat-sided oval, or a custom shape. Any geometric shape can be used (e.g., an N-sided polygon or a folded shape). Whatever the cross-section, the tube can be elongated with a cavity therein through which fluid can pass. The tube can be an etalon as described herein. The tube can be made of conductive material and can be a solid conductor.

Figure 2:
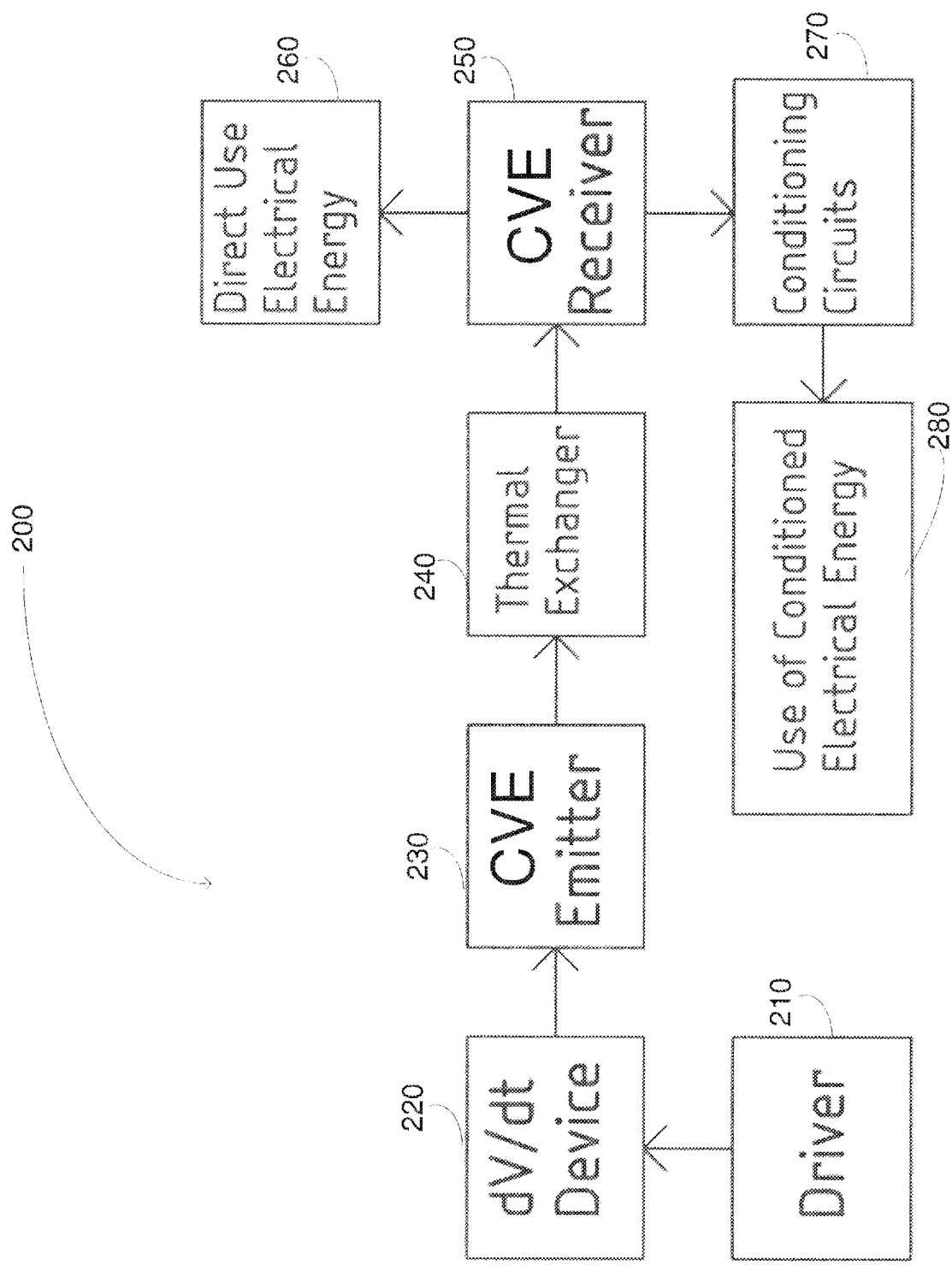
FIG. 2 illustrates a generic embodiment for a circuit for generating electrical energy using the CVE circuit of FIG. 1.

FIG. 2 shows a generic version of the circuit 200. An optional driver 210 can be a continuous pulse generator that supplies a continuous stream of pulses with high dV/dt. This provides the starting impulse to the device. It can serve as the on/off switch to run the device and it can help control the frequency at which the device is operated.

A dV/dt device 220 is shown. FIG. 1 showed the dV/dt device as a transformer or a coupled inductor 110 to indicate at least one way of generating a high dV/dt pulse or series of pulses. Alternatives to this could be a capacitor or capacitor array, a mechanical switch, or other spinning or rotation devices that bring an electrical (charge) or magnetic field (magnet) in proximity to another coil, capacitor, inductor, or another magnet or magnetic field. The CVE device may have one or more significant active devices incorporated within it. Examples are the negative resistance devices, such as a thyristor or Zener diode.

The CVE emitter 230 is shown coupled to a thermal exchanger 240. The thermal exchanger can, in turn, be coupled to a CVE receiver 250. The rapid formation of a dV/dt charge on the emitter 230 leads to the production of a "wave" of energy from the emitter. In this antenna-like mode, the emitter may be in contact with a material other than a vacuum or air. The material may have the properties of having a different dielectric constant or magnetic permeability characterized by its relative permittivity or permeability. It may also be in contact with a conductive material. The emitter 230 and receiver 250 can be a wide variety of materials (e.g., copper, brass, bronze, stainless steel, graphene) that create impedance changes at the ends of the etalon chamber. Indeed, anything can be used, so long as it changes the permittivity, permeability, or both with respect to the material between the emitter and receiver. Thus, the emitter 230 couples the circuit to the thermal exchanger 240 (which can be an etalon) and transmits a signal to the thermal exchanger. The receiver 250 receives the signal once it passes through the thermal exchanger.

The thermal exchanger 240 is shown as being between the CVE emitter and the CVE receiver. It may, in fact, be surrounding the emitter and the receiver. For example, where the thermal exchanger is a tube (e.g., an etalon) having a cavity therein, the emitter 230 and receiver 250 can be mounted in respective ends of the tube. The thermal exchanger provides the needed thermal conduction path for the materials to have a continual influx of thermal energy for conversion to electrical energy. The materials may also be electrically conductive. The thermal exchanger can be any device used to inject heat into the circuit. In one example, a tube (e.g., a conductive tube or non-conductive tube) is used that is filled with material having a desired permittivity and permeability. Potential materials include air, water, methanol, ethanol, and acetamide (or a solution in liquids such as water or ethanol). Ferrite slurries can also be used. The material can be pumped or circulated through the thermal exchanger using an external pump, not shown. Alternatively, the solid materials can be immobilized within the resonant cavity. Subsequently liquids can be pumped through the cavity to provide heat exchange to the materials and the cavity itself. Thus, the material can have a dual purpose of acting as a medium between the CVE emitter and CVE receiver and acting as a thermal exchanger having an external source that is circulated through the thermal exchanger. Electronic waves can be transmitted between the CVE emitter and CVE receiver and the permittivity and permeability of the materials contained therein can impact the resonant frequency.

The CVE receiver 250 is shown coupled to the thermal exchanger. It may or may not be in contact (e.g., air gapped or spaced) with the thermal exchanger 240. The receiver 250, by electrical induction from the wave, electrical contact with the thermal exchanger, or by electrical contact with the emitter 230 has the increased energy provided by the CVE. The receiver harvests the converted heat into an electrical conduction path to either be utilized directly by a load 260 or to be conditioned by a conditioning circuit 270. The load 260 can be any desired load and can have a resistive component (e.g., a light bulb). The conditioning circuit 270 are shown connected to the CVE receiver 250. This circuit 270 is typically a circuit to convert the AC signal (or pulsed DC) into another frequency range or convert to a DC voltage or voltages. An example conditioning circuit can be a full bridge rectifier and capacitor.

An electrical load 280 receives an output of the conditioning circuits 270. The load may be anything that uses electrical energy. It is similar to the direct use of the electrical energy load 260 but it may require conditioning from module 270. Module 260 is the direct use of the output of the CVE receiver 250. This output has typical AC signal characteristics. Resistive loads would be acceptable for this type of electrical characteristic as either square or sinusoidal waves.

Figure 3:
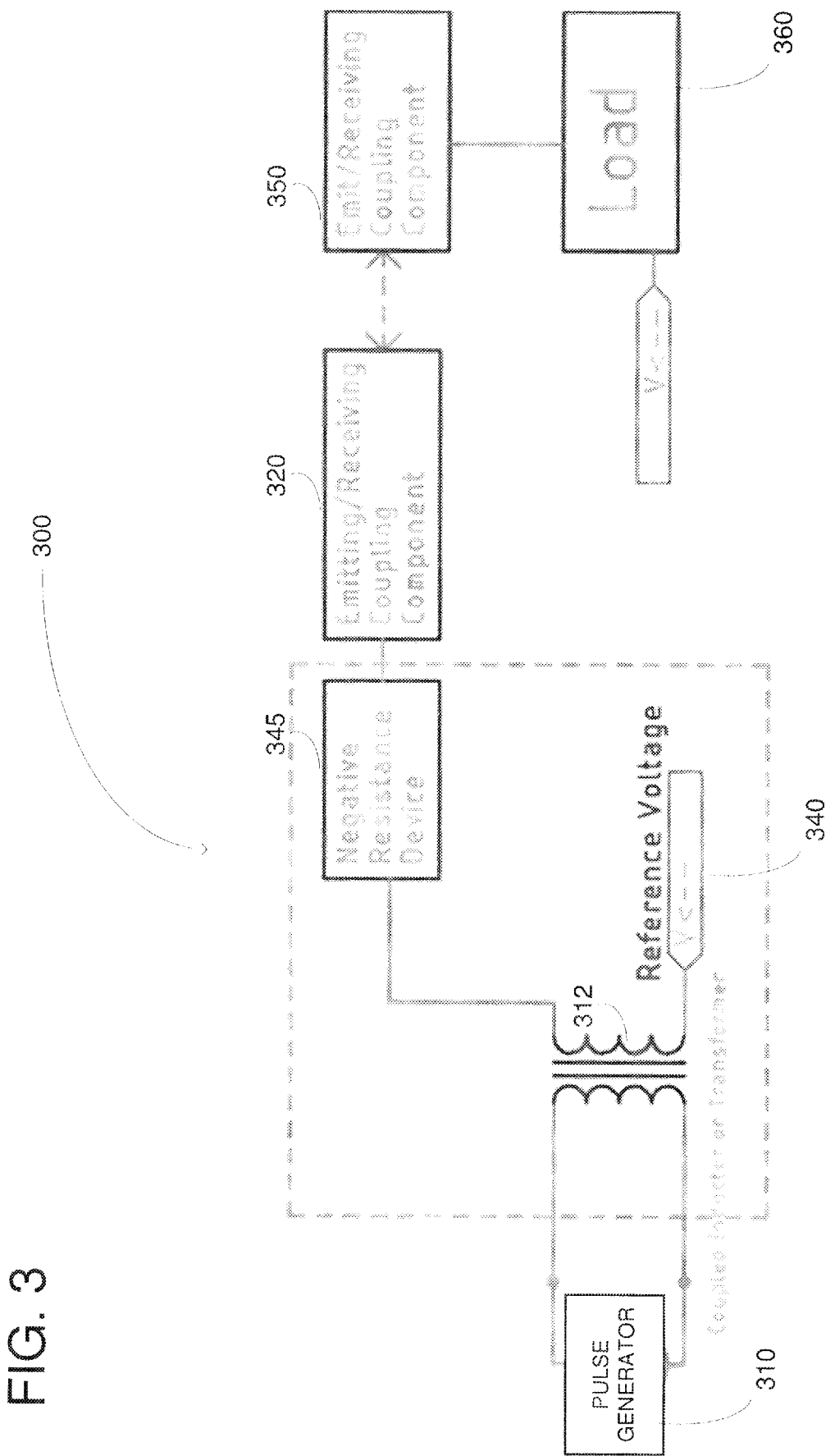
FIG. 3 shows another embodiment of a CVE circuit for generating electrical energy.

FIG. 3 is a circuit 300 in which the negative resistance device 345 is used in conjunction with the emission of the dV/dt wave as shown by connection to component 320. As previously stated, the negative resistance device is optional. A pulse generator 310 is coupled to an inductor or transformer 312. The output of the secondary of the coupled inductor or transformer 312 is referenced to a voltage indicated by V 340. The negative resistance device 345 is coupled to the inductor. The emission of the wave from component 320 can be coupled to the receiving component 350. The receiving component 350 can also be connected to a load 360. The connection between the receiving component 320 and the receiving component 350 is shown by a dashed bidirectional arrow and can be a vacuum, air, or other dielectric materials either homogeneous or heterogenous. Conductive materials can also be used.

Figure 4:
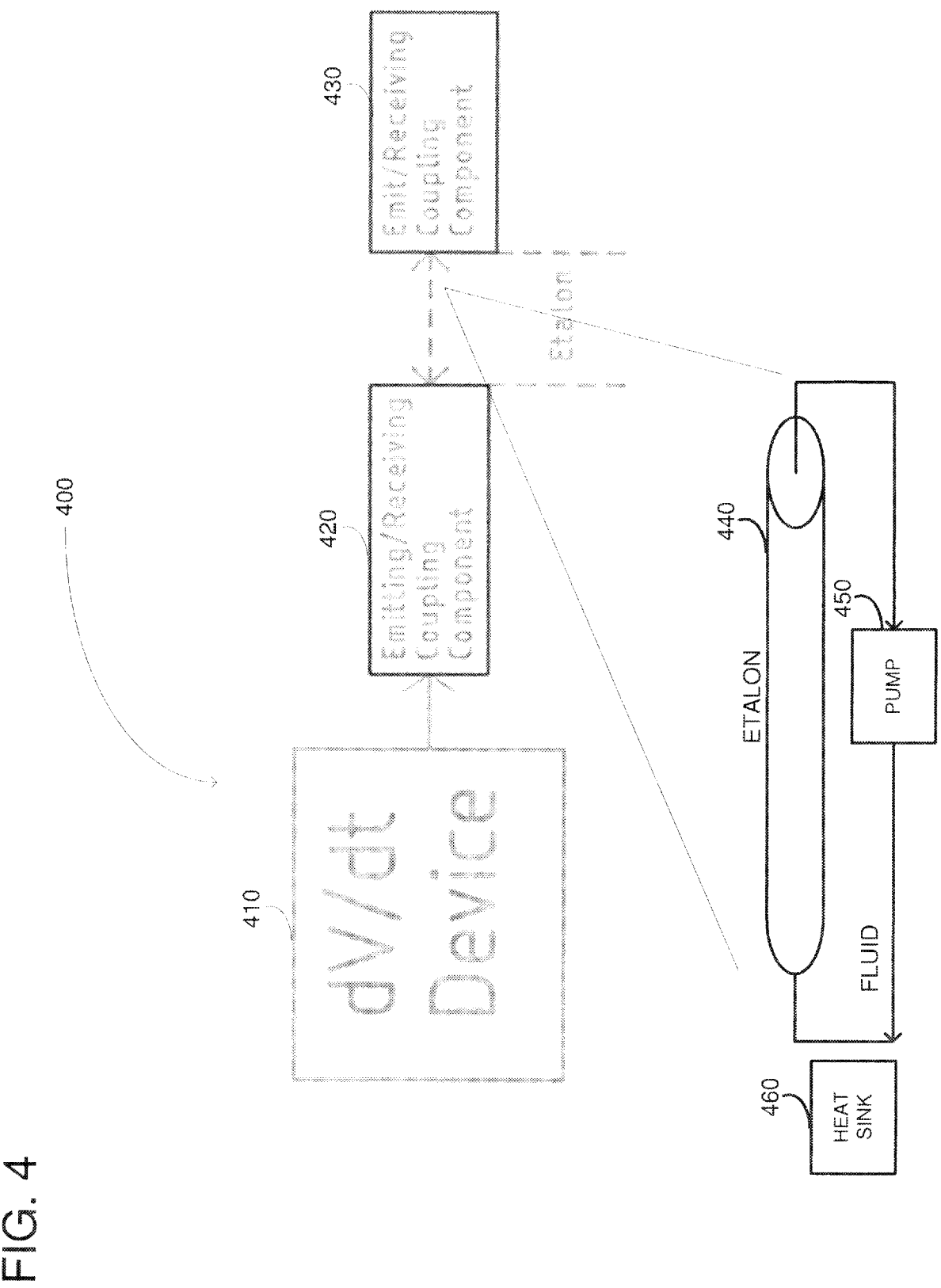
FIG. 4 shows an example etalon having fluid being pumped through a cavity therein.

FIG. 4 is a circuit 400 using an etalon for amplification. The dV/dT device 410 can be any pulse generator. Alternatively, as shown above, the dV/dT device can be a transformer coupled to a negative resistance device, as is shown in FIG. 3. The combination of elements 420, 430 comprise a resonance cavity similar to an etalon or Fabry-Perot interferometer. It can be similar to the description of the thermal exchanger 130. It is shown without a load. It may be utilized without an attached load by either emission of electrically induced waves or by simply being a higher voltage source reference for reference applications. With a load (e.g. resistive), the etalon can produce amplified power from the dV/dt device by capturing the thermal energy between the emitter and the receiver and the coupling component itself, particularly but not exclusively, when resonance occurs.

Activation frequencies can be used that are much lower than optical frequencies. In most cases, the lowest fundamental wavelength in the resonance cavity is very long compared to the relative sizes of the other components. In order to reduce the size of the resonance cavity, higher relative permittivity or permeability materials can be used to significantly reduce the length of the etalon involved. This area of the device is shown by the dotted double-headed arrow between components 420 and 430.

In the case of a high permittivity capacitors, relative permittivity in the ranges of 3 to ≥20,000 are not uncommon. Higher permittivity materials are known. These materials provide for a highly decreased etalon length by similar factors such as the square root of the inverse of the relative permittivity multiplied by the relative permeability.

An etalon 440 is shown between the components 420, 430. The etalon (waveresonantcavity) chamber can be considered as one (or more) of the oscillator components. This particular etalon differs from a purely electrical conductivity element by involving emitted electrical waves rather than electrical current oscillation in a conductor. A hollow etalon also provides the ability to fill the resonance cavity with a material that has a permittivity (and/or a magnetic permeability) that is greater than vacuum or air. This increased permittivity/permeability decreases the fundamental oscillation length. Folding (or coiling) the length helps reduce the overall size. The etalon cavity may be where most of the heat conversion to electrical energy will take place. Fluid can be moved through the etalon's cavity. The fluid will be constantly cooled by the resonance of the dV/dt waves while the movement of the etalon fluid provides a way to effectively get heat into the resonance volume by carrying the heat from an external source. Or, simple heat conduction/convection into the resonance cavity volume can be used to provide the heat from an external heat source, possibly using a second fluid (e.g. water) or heat pipe.

The etalon 440 is shown as a cylindrical tube, in this embodiment, with a cavity extending therethrough. A pump 450 is used to pump fluid through the etalon 440. A heat sink 460 is used to extract heat from the ambient environment and pass the heat to the fluid. The etalon can then convert the heat to electrical energy. The etalon can be filled with materials that have different permittivities and permeabilities, such as air, water, methanol, ethanol, and acetamide (e.g. in a solution of water or ethanol). Higher permittivity materials allow a lower drive frequency to be used and still be at resonance. The etalon can have a dual purpose of acting as an electrical coupling between the component 420 and the component 430 and also acting as a thermal exchanger.

The emitter 420 and receiver 430 can be a wide variety of materials (e.g., copper, brass, bronze, stainless steel, graphene) that create impedance changes at the ends of the etalon chamber. Different electrical elements can also be used as the emitter 420 and receiver 430, such as inductors and capacitors. Indeed, anything can be used, as long as it changes the permittivity, permeability, or both with respect to the material between the emitter and receiver. The load should be selected so as to have proper impedance matching with the source, as is well known in the laser, transmission, and antenna fields.

Figure 5:
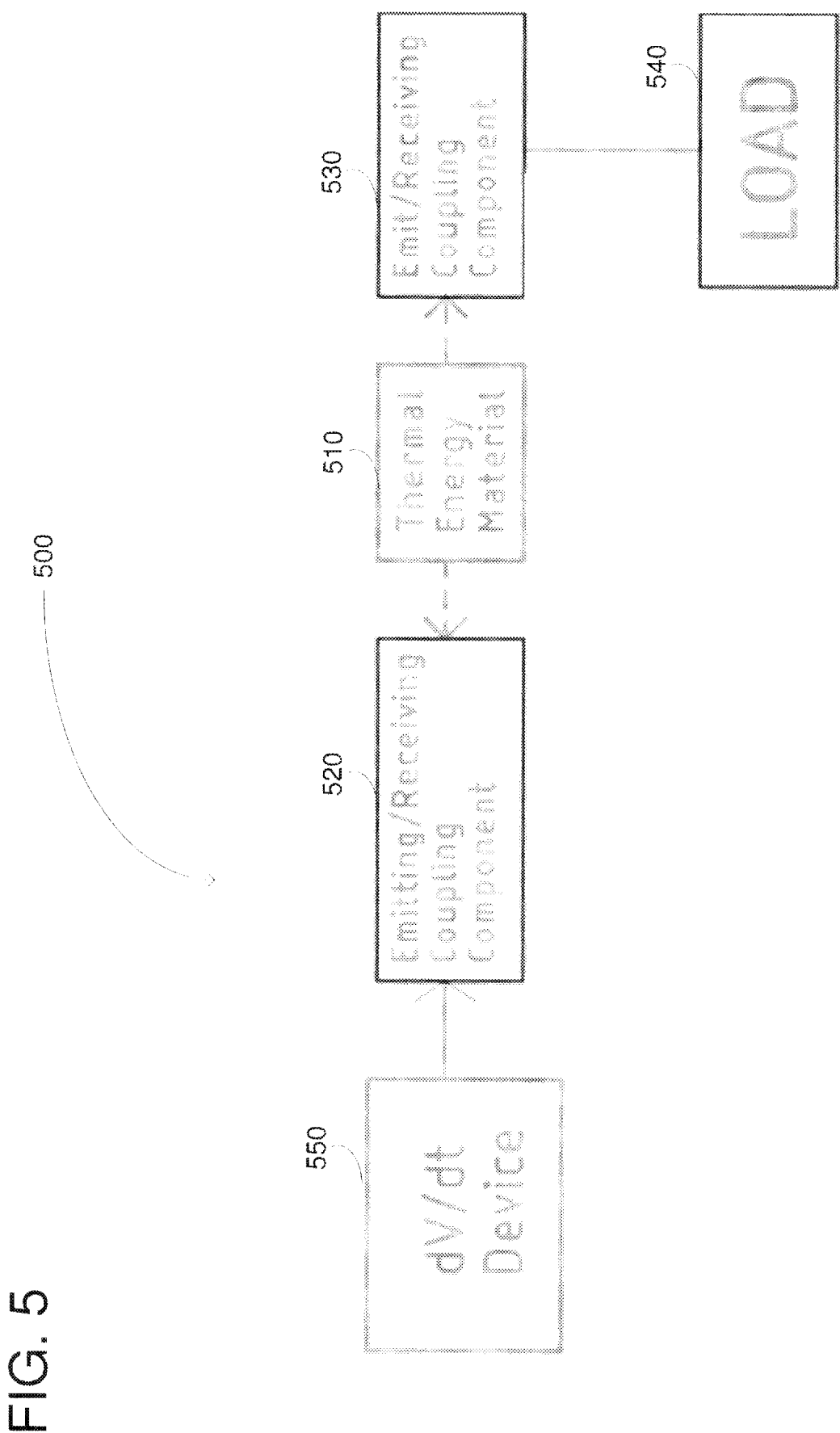
FIG. 5 is a circuit according to another embodiment for generating electrical energy.

FIG. 5 is a circuit 500 that is an additional schematic representation of the material 510 in between the etalon's reflective surfaces, 520 and 530. The thermal energy material 510 is in the transmissive path and/or reflective path of the wave coming from the emitter or the reflected wave from the receiver. Due to the CVE, the power in the wave is augmented by each traverse of the wave between the surfaces. In this way the material 510 is cooled, since the energy required for the increase in energy in the wave is obtained from the thermal energy contained in the material itself due to the law of conservation of energy.

To achieve resonance in a given cavity, the cavity's shape must be taken into account. Square or round shapes may be used as well as oval, elliptical, polygonal, and other geometrical shapes. Also, the material filling a resonance cavity plays a part in determining the frequency of resonance. Increasing the permittivity or permeability of the material filling a given cavity changes its resonance to a lower frequency. In the case of the frequency of electrical waves, the resonant frequency of the cavity is related to the square root of the inverse of the relative permittivity multiplied by the relative permeability of the material vs a pure vacuum. Thus, higher permeability and higher permittivity materials can lead to reduced physical sizes of the etalon cavity.

Higher permittivity materials (Thermal Energy Material) may be used to provide an etalon cavity that is substantially shorter (thereby smaller) than that with vacuum or air-filled cavity. Additionally, the material 510 may be thermally conductive to facilitate thermal transfer into the cavity from the environment or heat source. Liquid materials are attractive in that they can be circulated to facilitate heat transfer. Materials that can be used are those that are transmissive to the wave itself. Some materials (or mixtures, suspensions, or slurries thereof) that may be used but are not the limitation for use are as follows:

1. Barium titanate
2. Other Perovskite mixed metal titanates
3. Ferrite
4. Inorganic Oxides
5. Air
6. Organic alcohols
7. Organic materials that may be transmissive to the wave
8. Conductive metals
9. Semiconductive materials
10. Species of carbon (e.g. graphite, graphene, Fullerenes)
11. Materials which themselves re-resonate at other frequencies (e.g. phosphors, rhodamine) via harmonic generation
12. Water or water with dissolved salts, liquids, or other species suspended or homogeneous.

Materials can be used to partially fill or fully fill the cavity to provide a pathway for thermal conduction to the etalon cavity. The load 540 can be any desired electrical load, such as a load having a resistive component. The dV/dt device 550 is similar to those described above.

As an example of the device, the following set of components can be used.

1. Transformer (coupled inductor), 10:1 ratio, 2 A current rating, 700 uH secondary inductance
2. 0.01 uF, 1000 V ceramic capacitor
3. 254 uH ferrite single inductor, 10 A inductor
4. Copper tube (⅝" OD×½" ID×24 inches length)
5. Powdered ferrite (125 mesh)
6. Resistive load (110 Ohm, 100 W metal film resistor)
7. 2 pc Copper wire (10 AWG×1" long)
8. Zener Diode (1N5388)

Using the schematic shown in FIG. 1, the copper tube is first packed with the ferrite powder. One piece each of the copper wire is inserted into each end of the tube and used to make connection to the remainder of the circuit. The transformer is driven by means of a pulsed current source at a frequency of 1 Hz to several GigaHertz. The exact frequency required can be tuned by maximizing the ratio of power produced to the power necessary to drive the transformer's primary. The secondary of the transformer is attached to one piece of the copper wire in the copper tube. The other end of the copper tube with the remaining wire is attached to a negative resistance device such as a Zener diode. The other end of the diode is attached to an inductor. The remaining connection is led back to the secondary of the transformer's output. Electrical energy can be obtained by attachment of a capacitor to almost any portion of the above secondary circuit as a tap to the voltage produced in the resonance circuit. The remaining lead on the capacitor can optionally connect to a rectifier circuit for further conversion to an AC, pulsed DC, or smoothed DC output by conventional means.

Figure 6:
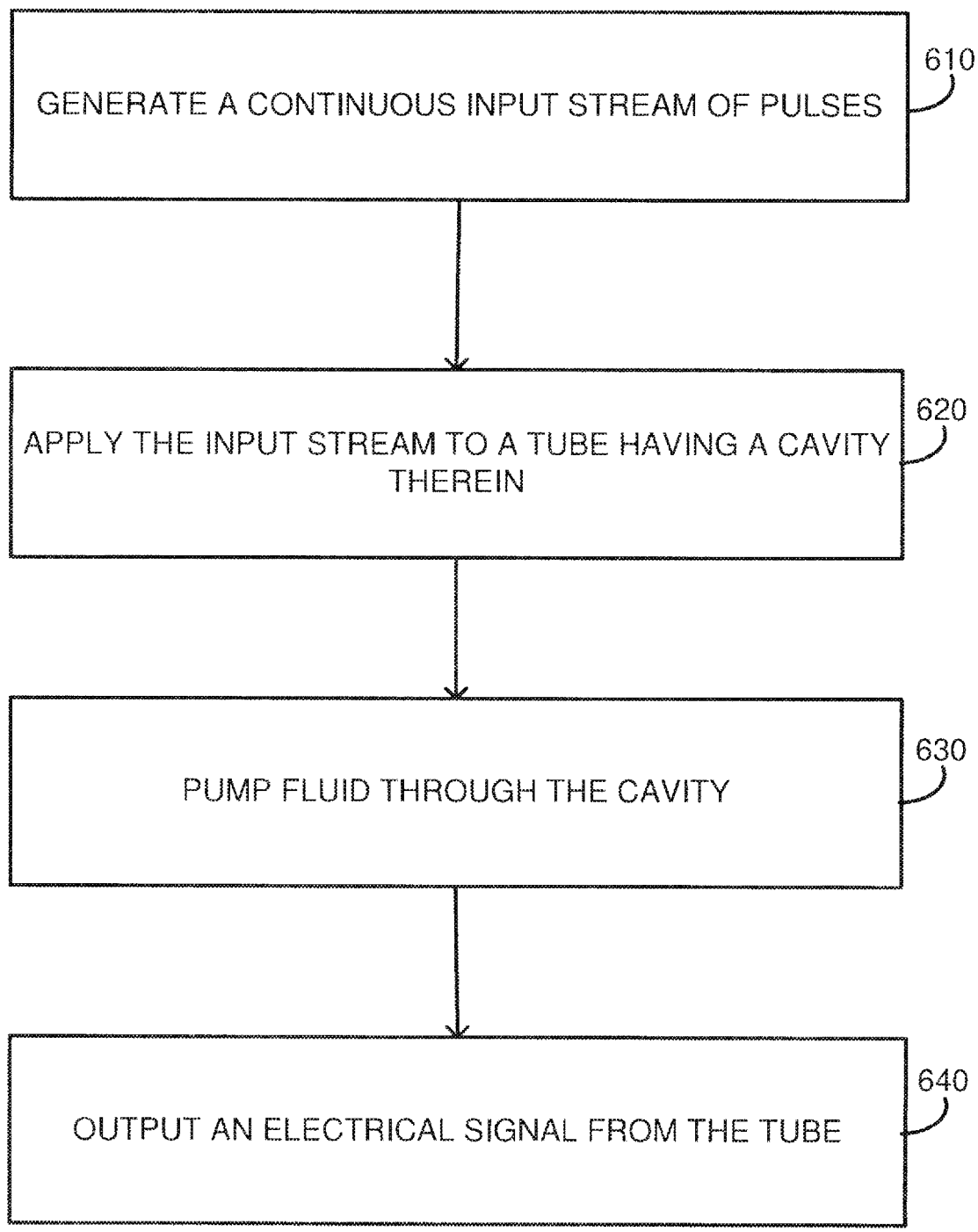
FIG. 6 is a flowchart according to another embodiment for generating electrical energy.

FIG. 6 is a flowchart for generating power according to an embodiment. In process block 610, a continuous stream of pulses is generated, such as by a pulse generator. The pulse generator can generate pulses having a dV/dt of 100V/μs or even 10,000 to 100,000 V/μs or higher. Specific use cases have used between 3 to 10V/μs. In some cases, 1V/μs can be used. In process block 620, the continuous stream of pulses is applied to a tube having a cavity extending therethrough. The tube can be conductive and have fluid continuously pumping through the cavity (process block 630). The fluid can be warmed by a heat sink or other heating element. The fluid can be cooled as it passes through the tube due to the CVE. At process block 640, an electrical signal can be output from the tube having a greater power than was output by the pulse generator due to conversion of thermal energy of the fluid to electrical energy. In some embodiments, an oscillator can be used to generate pulses at a greater frequency than the pulse generator.

Figure 7:
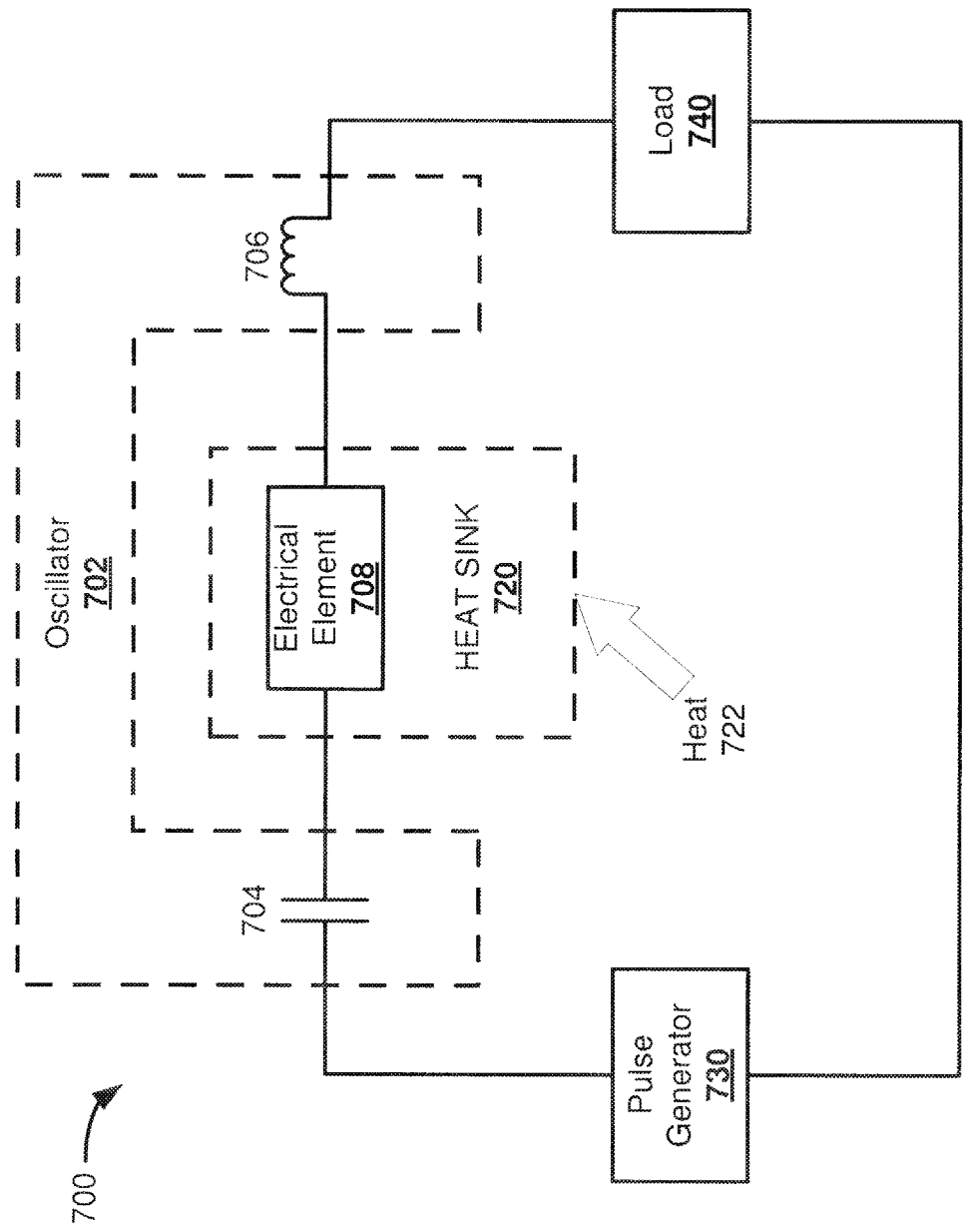
FIG. 7 is a circuit diagram according to another embodiment for generating electrical energy.

FIG. 7 shows another embodiment of a CVE circuit 700. The circuit 700 includes an oscillator 702, which includes a capacitor 704 and an inductor 706 to form an LC or tank circuit. Although the capacitor 704 and inductor 706 are shown coupled in series on opposite sides of an electrical element 708, they can be coupled in series and positioned together on one side of the electrical element. The circuit 700 further comprises a heat sink 720, which provides additional surface area that can allow for the absorption of additional heat 722 from a heat source, or from multiple different heat sources. The heat sink 720 can be thermally coupled to the electrical element 708 so as to allow heat transfer therebetween (e.g., direct contact). The heat source can include any source which is warmer than the electrical element 708 including ambient air in which the heat sink resides. The circuit 700 can operate similar to the circuits described above, wherein a pulse generator 730 can generate either a single electrical pulse, or a series of electrical pulses having a high dV/dt ratio. The oscillator 702 can generate an oscillating signal in response to each pulse and the electrical element 708 can convert thermal energy into electrical energy by cooling off and increasing the power of the electrical pulses output by the pulse generator 730. The heat sink 720 can absorb the heat 722 to provide the electrical element 708 with a constant source of thermal energy that can be converted to electrical energy. Accordingly, the electrical power provided to a load 740 is greater than the electrical power produced by the pulse generator 730.

Further advantages that the CVE transformer are the ease of accepting practically any electrical input form (AC, DC, etc.) with virtually any frequency or mixture of frequencies. It also has the benefit of its electrical output being a consistently known AC waveform relatively easily transformed to a broad array of electrical formats. Even in the cases where the desired electrical output waveform and voltage is the same as the input, the CVE transformer can provide value in removing and "cleaning" the input waveform into a more consistent specified output. Removal of spurious AC signals, DC offsets, and other forms of unspecified contamination of the power can be obtained. In addition, the frequency range of the input waveform can be both higher and lower than that of the output without having to modify the circuit in any way to use both the high frequencies and the low frequency components of the input simultaneously. Thus, the full energy content of the input can be more readily utilized. This is especially useful for input power that has frequencies above several hundred kHz where simple rectification of the electrical signal can be very inefficient.

Applications that can benefit from the CVE transformer include, but are not limited to, suppression of electrical noise in mass electric transportation due to lighting strikes, electric energy impulses from nuclear explosions, chemical weapons, sun related phenomena, and other high energy events that may impact electronics and electrical supplies. Other applications that may need to supplement one or more of the electrical inputs along with additional energy from the conversion of other heat or energy sources to an electrical output are also good uses.

Other forms of energy beside electrical energy may be input into the "CVE transformer". The energy inputs are either heat or an energy source that can be converted to heat. Examples are kinetic energy (flywheel), acoustic, optical, electromagnetic radiation, magnetic, chemical, nuclear (atomic), and gravity potential. All of these energy sources can ultimately lead to the production of heat energy.

Figure 8:
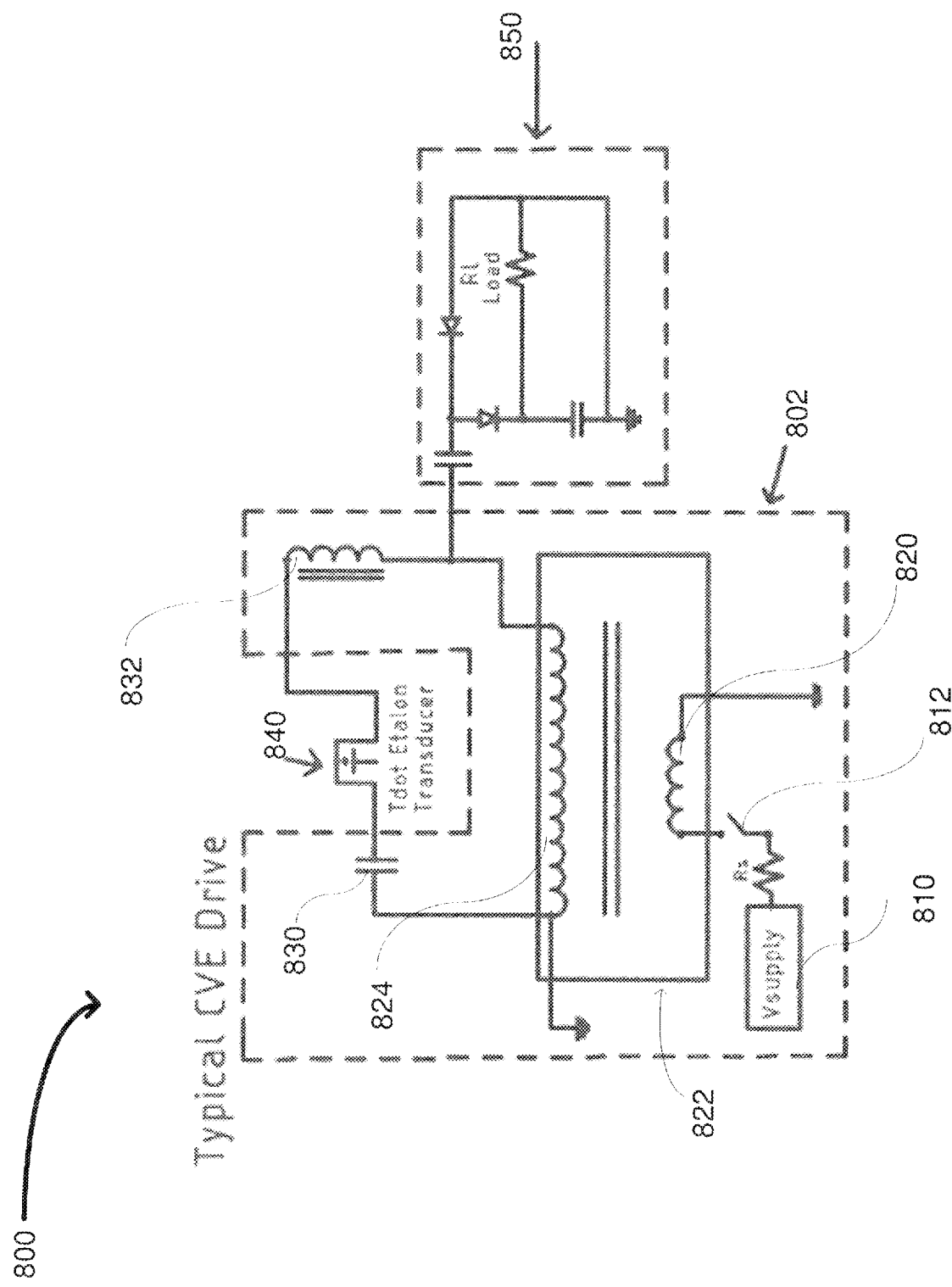
FIG. 8 is another embodiment of a CVE circuit.

FIG. 8 is another example of a CVE circuit 800 including a CVE drive 802 (shown in dashed lines) that can be used. In this example, a voltage supply 810 can be used to supply a stream of pulses in conjunction with a switch 812. The switch 812 can be controlled by a microprocessor (not shown). The switch 812 is coupled to a first winding 820 of an inductor 822. A second winding 824 of the inductor 822 is coupled to a capacitor 830 and an inductor 832 coupled in series and used as a secondary oscillator. An etalon 840 can be used as an electrical element and provides the energy transformation of heat to electrical energy using the cooling effect of the pulses generated by the voltage supply 810 and switch 812, in conjunction with the secondary oscillator formed by the capacitor 830 and the inductor 832. Due to the injection of heat into the etalon 840, increased energy can be supplied to a load circuit 850 than is supplied by the voltage supply 810.

Figure 9:
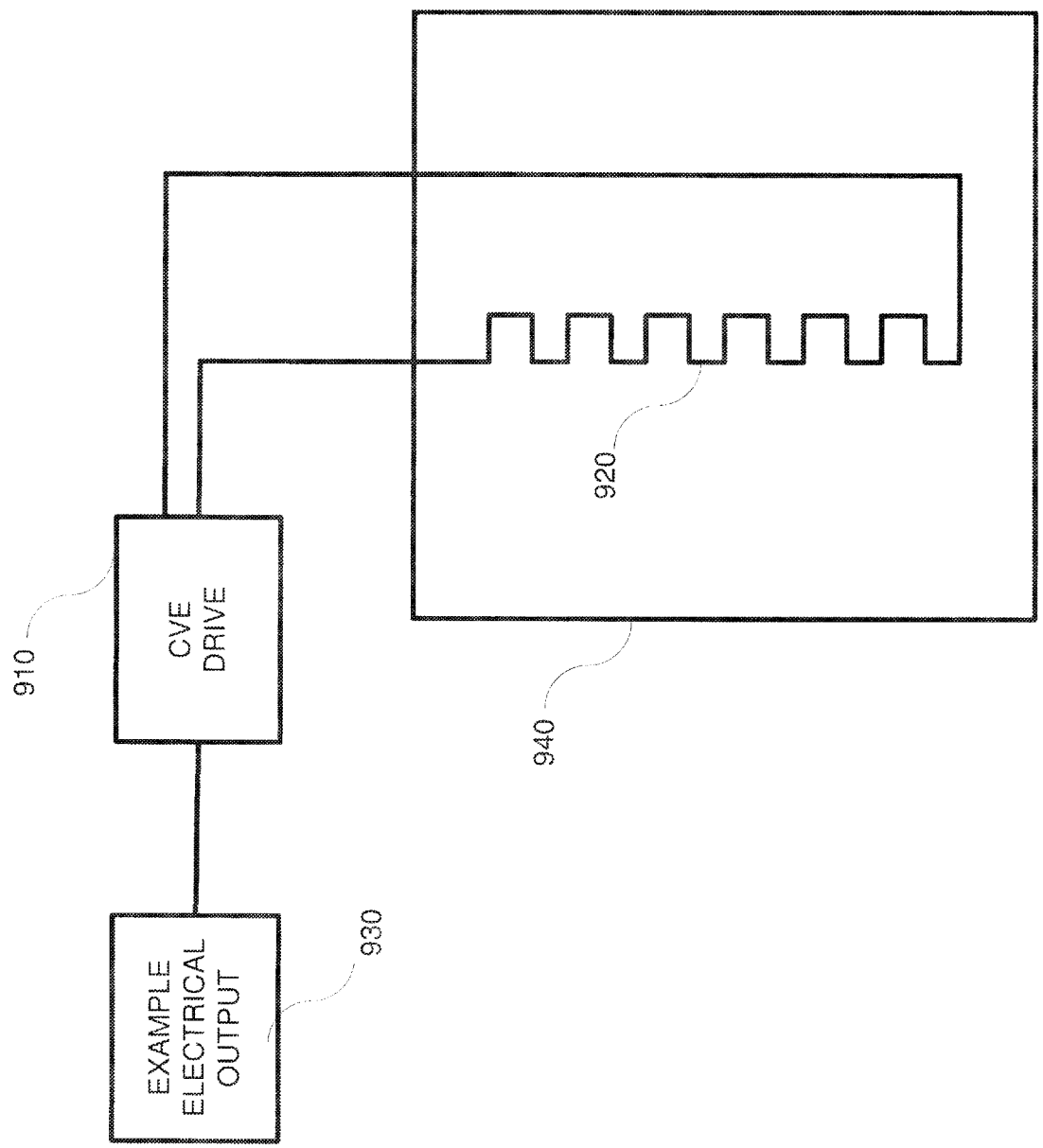
FIG. 9 is an exemplary application of the CVE circuit.

FIG. 9 shows the CVE drive 910 (which can be any CVE circuit described above) coupled to a copper wire 920, which functions as an etalon. The CVE drive can also be coupled to an electrical load 930. The copper wire 920 can be wound around an insulator and placed into a heat-absorbing system 940. The heat-absorbing system 940 can be a metal heat sink having a surface area and weight greater than the copper wire 920. Alternatively, the heat-absorbing system 940 can be liquid-based, such as the copper wire submerged in water such that the water has a greater surface area than the copper wire. Thus, a wide variety of different heat-absorbing systems can be used.

Other forms of energy beside electrical energy may be input into the CVE drive. The energy inputs are either heat or an energy source that can be converted to heat. Examples are kinetic energy (flywheel), acoustic, optical, electromagnetic radiation, magnetic, chemical, nuclear (atomic), and gravity potential. All of these energy sources can ultimately lead to the production of heat energy.

There can be many sources of heat energy that are allowed to contact the wire 920. Any number of the thermal energy sources are all homogenized into thermal energy contained within the heat-absorbing system 940. The source and characteristics of the heat energy are not important as any heat can be converted into electrical energy. The circuit is advantageous when the sources of the thermal energy are normally difficult to transform by known methods into other forms of electrical energy. Examples include multigigahertz microwaves, low frequency AC, low voltage DC and AC, unreferenced AC and DC potentials, and extremely high voltage AC and DC. Energies can be converted to heat and then to electrical energy, such as in the case of electromagnetic waves in the region of infrared, visible, ultraviolet, and higher frequencies. Additionally, low-grade waste heat can be transformed into useful electrical output.

Further advantages that the CVE circuit includes the ability to accept practically any electrical input form (AC, DC, etc.) with virtually any frequency or mixture of frequencies. It also has the benefit of its electrical output being a consistently known AC waveform relatively easily transformed to a broad array of electrical formats. Even in the cases where the desired electrical output waveform and voltage is the same as the input, the CVE circuit can provide value in removing and "cleaning" the input waveform into a more consistent specified output. Removal of spurious AC signals, DC offsets, and other forms of unspecified contamination of the power can be obtained. In addition, the frequency range of the input waveform can be both higher and lower than that of the output without having to modify the circuit in any way to use both the high frequencies and the low frequency components of the input simultaneously. Thus, the full energy content of the input can be more readily utilized. This can be useful for input power that has frequencies above several hundred kHz where simple rectification of the electrical signal can be very inefficient.

Applications that can benefit from the CVE circuit include, but are not limited to, suppression of electrical noise in mass electric transportation due to lighting strikes, electric energy impulses from nuclear explosions, chemical weapons, sun related phenomena, and other high energy events that may impact electronics and electrical supplies. Other applications that supplement one or more of the electrical inputs along with additional energy from the conversion of other heat or energy sources to an electrical output can also be used.

Figure 10:
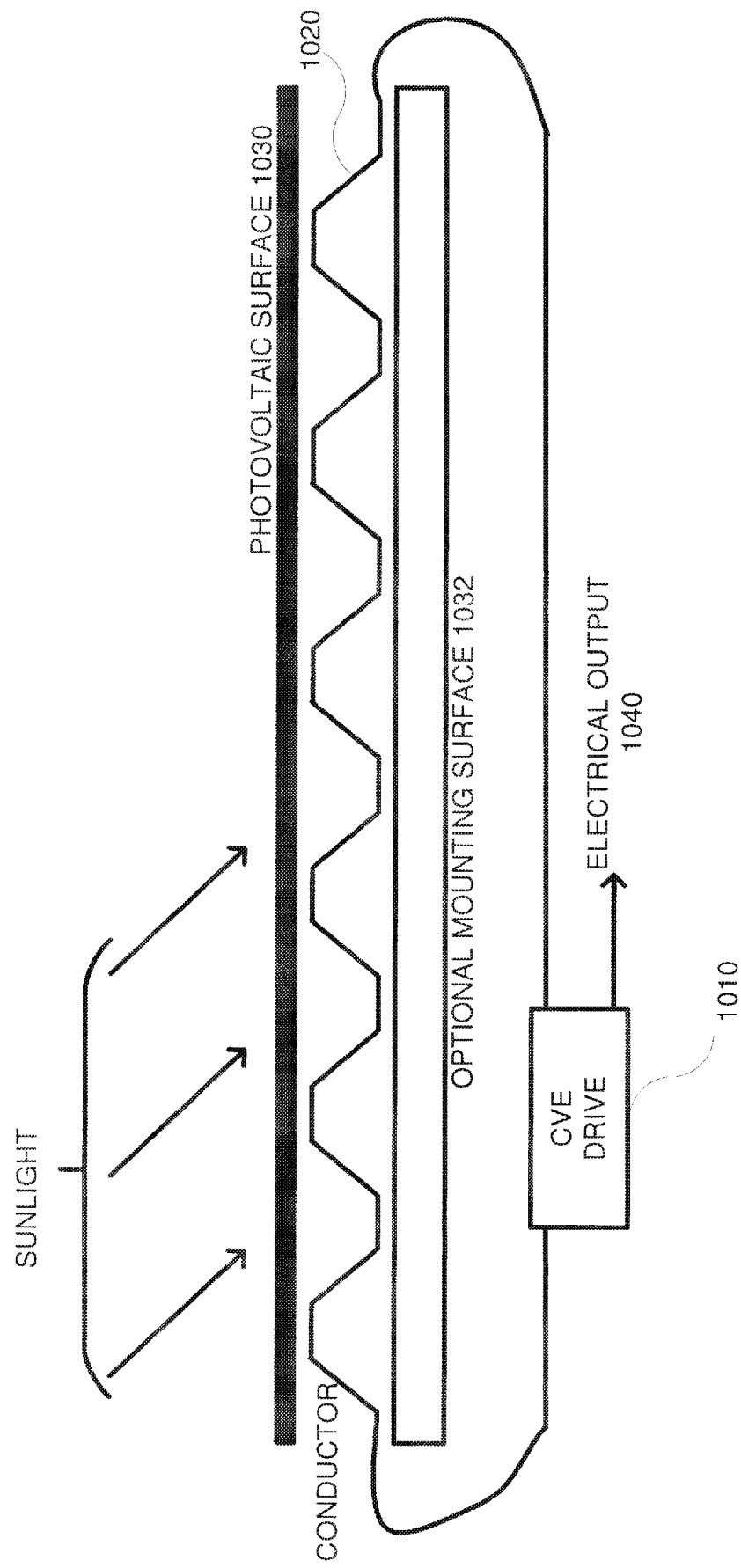
FIG. 10 is an exemplary application of the CVE circuit used in conjunction with a photovoltaic surface.

FIG. 10 shows that the CVE drive 1010 can be applied solar panel overheating. This electrical circuit has the capabilities of providing an electrical switched pulse to a plane of conductive material 1020, such as a copper plane, mounted behind the photovoltaic surface 1030. The conductive material 1020 can be mounted on a mounting surface 1032. The conductive material 1020 cools in response to the CVE drive 1010 being driven with pulses. The conductor 1020 absorbs low-grade waste heat from the photovoltaic surface 1030 while producing an AC voltage at the circuit's output 1040. The mounting surface 1032 can protect the conductor 1020 from inadvertent contact and also provide a thermal barrier to the outside environment.

Figure 11:
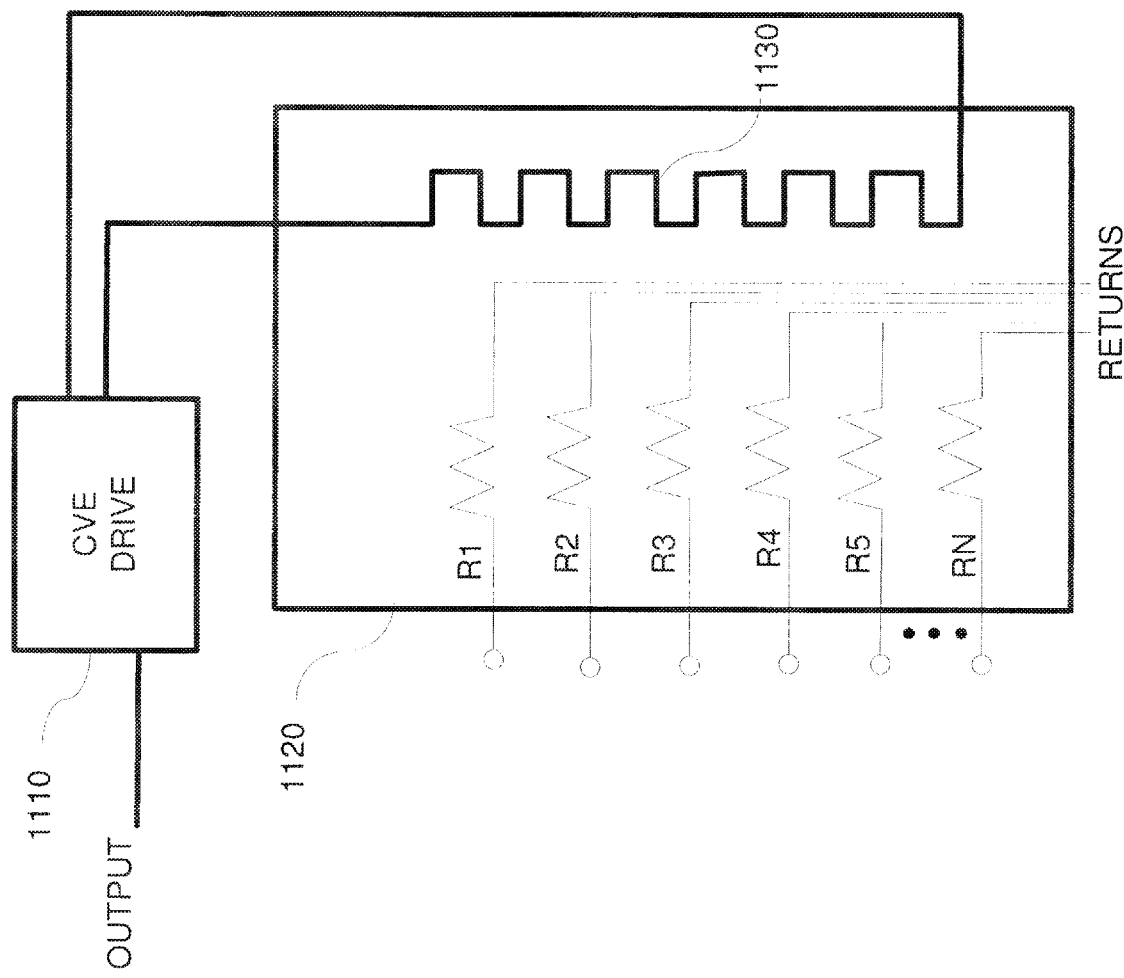
FIG. 11 is an exemplary application of the CVE circuit used in conjunction with multiple different heat sources.

FIG. 11 shows another embodiment that can convert practically any voltage source at practically any frequency or any other potential heat source into a single controlled AC voltage output. At the device's inputs, the device absorbs electrical energy of AC, DC, pulsed DC, or mixture thereof, over a wide range of voltages, currents, and frequencies, heat energy directly, or by electromagnetic absorption. The device is capable of absorbing the input electrical energy, converting that energy to thermal energy, and then converting the heat energy to the form of electrical energy as its output in a single electrical energy format no matter what mixture of electrical, electromagnetic, or thermal energy was provided at its input.

Circuits for further transforming the electrical energy output of the CVE drive 1110 may optionally be connected to convert the electrical energy into other electrical specifications. The AC output of the CVE drive 1110 is particularly well suited to be converted from its 0 to 600 VAC at 6 to 300 kHz form to almost any DC or AC voltage and current in normal use. Voltages such as 120 VAC at 60 Hz or 240V at 50 Hz could be easily added to its output. DC voltages such as 3.3, 5, 9, 12, 24, 48, 96, 200, 400 VDC can be easily added at its output as well.

A heat-absorbing system 1120 can be a thermally isolated box to contain the thermal elements or simply a box to prevent accidental contact, or it may not be used at all. Multiple resistors R1-RN are shown inside the heat-absorbing system for input of electrical energy sources. The number of inputs can range from 0 to N, where N is any integer value. If there are multiple voltage and current sources, the inputs may be comprised of several different resistors that are independently connected to the return lines of their various sources as represented by the "Returns" label symbol. The multiple returns may be necessary to prevent "cross-talk" from one voltage/current source to the other. The value of the resistors is governed by the power required from the input source and its voltage and current characteristics. Typically, the resistive heating elements are made such that they are enclosed in a thermally conductive but electrically non-conductive housing for safety. Electrical signals fed into the typical resistive input are converted to heat. The interior of the electrically non-conductive housing of heat-absorbing system 1120 may then be in thermal contact with the conductor 1130 coupled to the CVE drive 1110, or, as an alternative, the resistive elements may be mounted directly on the conductor 1130. The resistive elements are comprised of simple resistance elements such as carbon composition resistors to convert the electrical signals by Joule heating into thermal energy. Alternatively, the resistive elements may be actively controlled electronic elements such as transistors that may have variable resistance. Other variable resistive elements can be used. The wattage of the resistors may be from microwatts to several kilowatts and larger.

The conductor 1130 is cooled in response to the CVE drive 1110 and may also be in contact with other heat sources that are not electrical, such as heated air, liquids, and/or solids that may have thermal characteristics suitable for interface to the cooling module. As examples, simple direct contact with the heat-absorbing system 1120 may be performed by mounting a heat source directly in thermal conductive contact with conductor 1130. Or a more complicated method of using a pumped liquid to transfer heat from the resistive elements to the conductor 1130 can be used. Additionally, the area 1120 may be heated by electromagnetic radiation, induced magnetic warming, or other sources of thermal energy.

The output may have a connected load which may be a rectifier circuit to convert the AC (alternating current) electrical output of the CVE drive 1110 to a pulsed DC (direct current), DC, or other waveshape that may be desired. The device is capable of absorbing electrical energy of virtually any voltage and waveshape or AC/DC/pulsed DC form. Inputs for the heat energy from 0 to 50 GHz can be easily utilized. Furthermore, other sources of heat energy can be added to enhance the power of the output of the CVE drive 1110. Application of photonic energy into the heat-absorbing system 1120 can also be implemented as an additional thermal source. As an example, if a side of the heat-absorbing system was optically clear to the EM radiation, the conductor 1130 can be directly used to absorb and convert the radiation into thermal energy and then to electrical output. Because the CVE drive 1110 can work with very low temperature differential, it is usually unnecessary to have high temperature materials in contact with the conductor 1130 itself. In this context, heat from sources not usually considered as anything but waste heat can be used as good supplies of thermal energy.

Figure 12:
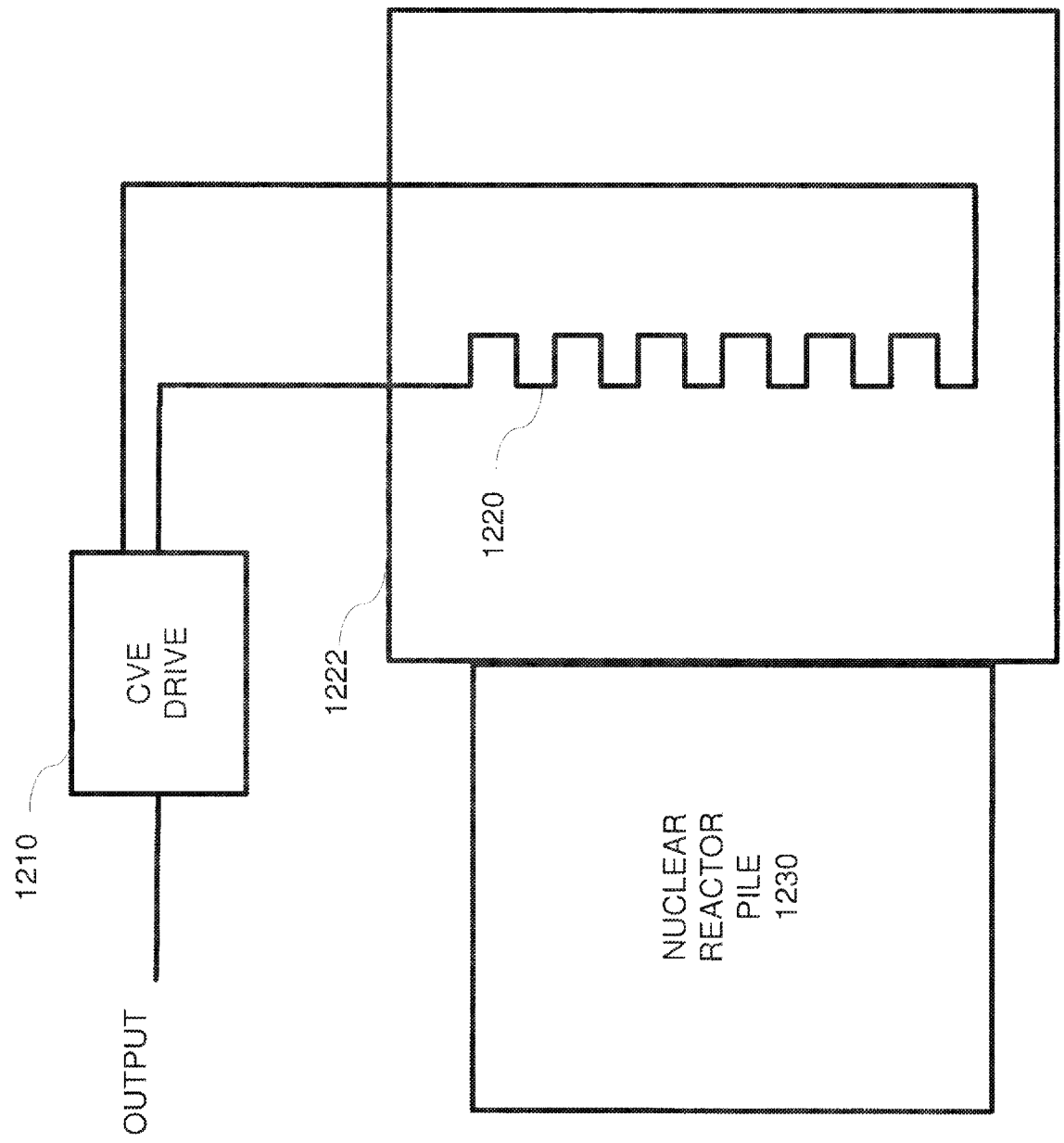
FIG. 12 is an exemplary application of the CVE circuit used in conjunction with a nuclear reactor pile.

FIG. 12 shows another application of using a CVE drive 1210. The CVE drive 1210 can cool a conductor 1220 within a heat-absorbing system 1222. A nuclear reactor pile 1230 can be adjacent to the heat-absorbing system 1220. The cooling effect of the conductor 1120 can be used to absorb waste heat from the nuclear reactor pile 1230 and the heat energy can be converted by the CVE drive 1210 to electrical energy to transmit on the output. The CVE drive not only converts waste heat to electrical energy, but also increases the safety of the energy producing device. The elimination of the circulators for the heat transferring components from the nuclear pile allows the device to be a solid-state nuclear reactor that can function at a much lower temperature level. The nuclear reactor pile can be a container of radioactive materials that decays and produces heat for the conductor 1220 in the heat-absorbing system 1222. Active nuclear reactions by an actively controlled chain process may not be desirable or necessary. A sealed container radioactive heat source could be used to enormously simplify the source of the heat.

The radioactive waste materials from the reactor itself can also serve as a source of low-level heat for this converter, circumventing the need for high temperature steam to run a turbine. In this case a low temperature nuclear reactor could be used, thereby increasing the physical safety around the reactor itself as well as the overall density of neutrons.

This method of pairing a nuclear heat source to the CVE drive 1210 can also be used to provide electrical power for a spacecraft. The fuel needed by a spacecraft can be nuclear radioactive materials, but the reactor itself could run at a much lower temperature due to the efficiency of the CVE drive at low temperatures. For this reason, the need for heavier shielding and containment is lessened and the longevity of power is prolonged.

The direct (unmodified standard) electrical output from the CVE drive 1210 can be a medium frequency AC signal in the range of 10 Hz to 750 MHz, although the exact frequency may lie outside of these bounds. The exact frequency is determined by the shape, lengths, and materials of the conductor 1220. This standard output can be used directly by a number of different "loads" for any application that can use it. Applications that could use the direct output of the device include resistive heating elements, inductive coils, and AC rectifying elements. The inductive and rectifying elements may include further circuits for transforming the direct output (AC) of the CVE drive 1210 into other electrical energy waveforms.

Figure 13:
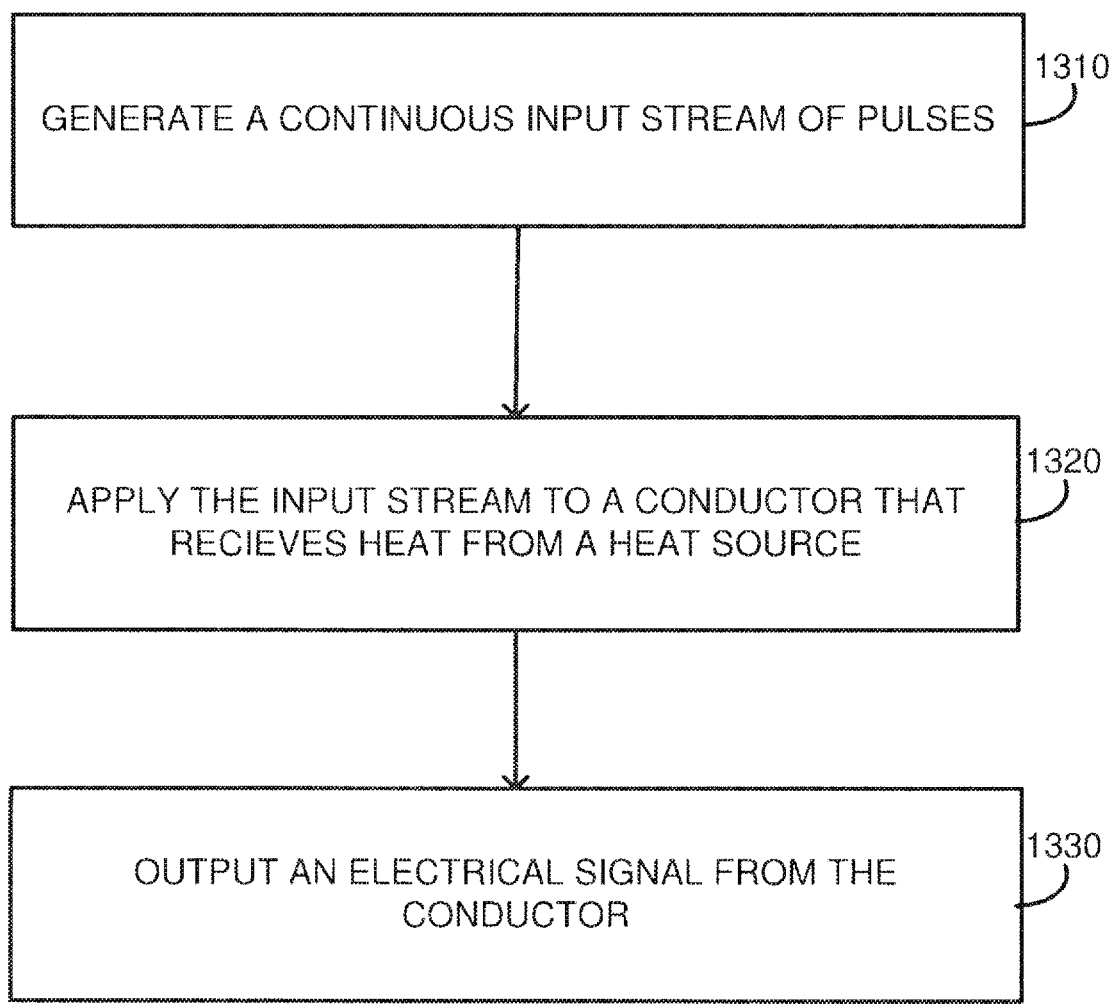
FIG. 13 is a flowchart of an embodiment for using the CVE circuit.

FIG. 13 is a flowchart of a method according to one embodiment. In process block 1310, a continuous stream of pulses is generated. For example, in FIG. 1, the pulse generator 105 can generate a stream of pulses into the inductor 110. As further examples, the pulse generator 310 of FIG. 3 or the pulse generator 730 of FIG. 7 can be used. Still further, the voltage supply 810 in conjunction with the switch 812 can be used to generate a continuous stream of pulses. In process block 1320, the continuous stream of pulses is applied to a conductor that receives heat from a heat source. The conductor can be an etalon, as shown at 440 in FIG. 4. Alternatively, the conductor can be a wire. The heat source can be any of multiple different types of heat sources. For example, the heat source can be associated with solar power, as shown in FIG. 10, or a nuclear reactor pile, as shown in FIG. 12. Virtually any source of heat or multiple combinations of heat sources can be used. In process block 1330, an electrical signal can be output from the conductor and supplied to an output load, such as load 740 in FIG. 7. The output electrical signal can be boosted by converting heat from one or more of the heat sources to electrical energy.

The following numbered paragraphs summarize the embodiments herein:

Paragraph 1. A circuit for generating electrical energy, comprising:
  a pulse generator for generating a continuous stream of pulses;
  a conductor coupled to the pulse generator that is configured to cool in response to the continuous stream of pulses;

a heat source placed adjacent to the conductor; and
an output for receiving an electrical output emitted from the conductor.

Paragraph 2. The circuit of paragraph 1, wherein the conductor is a tube.

Paragraph 3. The circuit of any of paragraphs 1 or 2, wherein the tube is filled with material having a predetermined permittivity or permeability larger than a vacuum.

Paragraph 4. The circuit of any of paragraphs 1-3, further including a pump for pumping fluid through the tube.

Paragraph 5. The circuit of any of paragraphs 1-4, wherein the fluid exchanges heat with the tube and the heat source supplies heat to the fluid.

Paragraph 6. The circuit of any of paragraphs 1-5, wherein the conductor is a tube having a cavity therein with a semiconductor or metal at least partially filling the cavity.

Paragraph 7. The circuit of any of paragraphs 1-6, wherein the heat source receives heat from a photovoltaic surface.

Paragraph 8. The circuit of any of paragraphs 1-7, wherein the heat source receives heat from a nuclear reactor pile.

Paragraph 9. A method for generating electrical energy, comprising:
generating a continuous input stream of pulses;
applying the input stream of pulses to a conductor that receives heat from a heat source, wherein the input stream of pulses cools the conductor; and
outputting an electrical signal from the conductor.

Paragraph 10. The method of paragraph 9, further including transmitting the continuous input stream of pulses through a negative resistance.

Paragraph 11. The method of paragraphs 9-10, wherein the conductor is a tube having a cavity therein.

Paragraph 12. The method of paragraphs claim 9-11, wherein the heat source is a photovoltaic surface.

Paragraph 13. The method of paragraphs 9-12, wherein the heat source is a nuclear reactor pile.

Paragraph 14. The method of paragraphs 9-13, wherein the continuous stream of pulses is at a first frequency and further including generating a signal at a second frequency greater than the first frequency using an oscillator circuit coupled to the conductor.

Paragraph 15. The method of paragraphs 9-14, wherein the conductor is a tube, which has fluid pumped therethrough and the fluid receives the heat from the heat source.

Paragraph 16. An apparatus for generating electrical energy, comprising:
a pulse generator to generate a continuous stream of electrical pulses having a first power; and
a conductor coupled to the pulse generator, the conductor for providing electrical energy to a load, wherein the conductor is configured to receive heat from a heat source, and wherein the conductor is configured to cool in response to the continuous stream of electrical pulses.

Paragraph 17. The apparatus of paragraph 16, wherein the conductor is a tube is configured to receive the heat and convert the heat into electrical energy.

Paragraph 18. The apparatus of paragraphs 16-17, further including an oscillator coupled in series with the tube, wherein the electrical pulses are at a first frequency and the oscillator generates pulses at a second frequency, greater than the first frequency.

Paragraph 19. The apparatus of paragraphs 16-18, further including a thyristor coupled in series with the oscillator.

Paragraph 20. The apparatus of paragraphs 16-19, wherein the continuous stream of electrical pulses is at a first frequency and further including generating a signal at a second frequency greater than the first frequency using an oscillator circuit coupled to the conductor.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A circuit for generating electrical energy, comprising:
a pulse generator for generating a stream of pulses at a frequency;
an etalon coupled to the pulse generator that is configured to cool in response to the stream of pulses, wherein the frequency of the stream of pulses is such that the etalon has a resonance at that frequency, wherein the stream of pulses is applied to the etalon, electrically passes through the etalon and outputs an electrical output from the etalon;
a heat source placed adjacent to the etalon; and
an output for receiving the electrical output emitted from the etalon.

2. The circuit of claim 1, wherein the etalon is a tube.

3. The circuit of claim 2, wherein the tube is filled with material having a predetermined permittivity or permeability larger than a vacuum.

4. The circuit of claim 2, further including a pump for pumping fluid through the tube.

5. The circuit of claim 4, wherein the fluid exchanges heat with the tube and the heat source supplies heat to the fluid.

6. The circuit of claim 1, wherein the etalon is a tube having a cavity therein with a semiconductor or metal at least partially filling the cavity.

7. The circuit of claim 1, wherein the heat source receives heat from a photovoltaic surface.

8. The circuit of claim 1, wherein the heat source receives heat from a nuclear reactor pile.

9. A method for generating electrical energy, comprising:
generating an input stream of pulses at a frequency;
applying the input stream of pulses to an etalon that receives heat from a heat source, wherein the input stream of pulses cools the etalon, wherein the etalon resonates at the frequency of the input stream of pulses, wherein the input stream of pulses is applied to the etalon and electrically passes through the etalon; and
outputting an electrical signal from the etalon.

10. The method of claim 9, further including transmitting the input stream of pulses through a negative resistance.

11. The method of claim 9, wherein the etalon is a tube having a cavity therein.

12. The method of claim 9, wherein the heat source is a photovoltaic surface.

13. The method of claim 9, wherein the heat source is a nuclear reactor pile.

14. The method of claim 9, wherein the stream of pulses is continuous and the frequency is at a first frequency and further including generating a signal at a second frequency greater than the first frequency using an oscillator circuit coupled to the etalon.

15. The method of claim 9, wherein the etalon is a tube, which has fluid pumped therethrough and the fluid receives the heat from the heat source.

16. An apparatus for generating electrical energy, comprising:

a pulse generator to generate a stream of electrical pulses having a first power and a first frequency; and a conductor coupled to the pulse generator, the conductor for providing electrical energy to a load, wherein the conductor is configured to receive heat from a heat source, and cool in response to the stream of electrical pulses, wherein the frequency of the stream of electrical pulses is such that the etalon has a resonance at that frequency and wherein the stream of electric pulses is applied to the etalon, electrically passes through the etalon and outputs an electrical output from the etalon.

17. The apparatus of claim 16, wherein the conductor is a tube is configured to receive the heat and convert the heat into electrical energy.

18. The apparatus of claim 17, further including an oscillator coupled in series with the tube, wherein the frequency is a first frequency and the oscillator generates pulses at a second frequency, greater than the first frequency.

19. The apparatus of claim 18, further including a thyristor coupled in series with the oscillator.

20. The apparatus of claim 16, wherein the frequency is a first frequency and further including generating a signal at a second frequency greater than the first frequency using an oscillator circuit coupled to the conductor.

* * * * *

UNITED STATES PATENT AND TRADEMARK OFFICE
CERTIFICATE OF CORRECTION

PATENT NO. : 11,677,338 B2  
APPLICATION NO. : 17/718090  
DATED : June 13, 2023  
INVENTOR(S) : Carver et al.

Page 1 of 1

It is certified that error appears in the above-identified patent and that said Letters Patent is hereby corrected as shown below:

In the Claims

Column 15:
Lines 12-13, Claim 17, "conductor is a tube is configured to receive" should read --conductor is a tube configured to receive--

Signed and Sealed this  
Twenty-second Day of July, 2025

Coke Morgan Stewart  
*Acting Director of the United States Patent and Trademark Office*